US012631189B2

(12) United States Patent
Hsieh et al.

(10) Patent No.: US 12,631,189 B2
(45) Date of Patent: May 19, 2026

(54) CEILING FAN WITH ELECTRONIC PAPER DISPLAY ASSEMBLY

(71) Applicant: HOTECK INC., Taichung City (TW)

(72) Inventors: Lung-Fa Hsieh, Taichung City (TW); Yu-Chen Hsieh, Taichung City (TW); Min-Yuan Hsiao, Taichung City (TW); Yu-Min Cho, Taichung City (TW); Shih-Kai Lin, Taichung City (TW)

(73) Assignee: HOTECK INC., Taichung City (TW)

( * ) Notice: Subject to any disclaimer, the term of this patent is extended or adjusted under 35 U.S.C. 154(b) by 0 days.

(21) Appl. No.: 18/976,353

(22) Filed: Dec. 11, 2024

(65) Prior Publication Data

US 2025/0223971 A1 Jul. 10, 2025

Related U.S. Application Data

(60) Provisional application No. 63/617,772, filed on Jan. 5, 2024.

(51) Int. Cl.

*F04D 25/08* (2006.01)
*F04D 29/00* (2006.01)
*F21V 33/00* (2006.01)

(52) U.S. Cl.

CPC ......... *F04D 25/088* (2013.01); *F04D 29/005* (2013.01); *F21V 33/0096* (2013.01)

(58) Field of Classification Search

None
See application file for complete search history.

(56) References Cited

U.S. PATENT DOCUMENTS

| | | | | |
|---|---|---|---|---|
| 6,461,032 | B2 * | 10/2002 | McKinley | F21V 23/0435 362/555 |
| 9,786,194 | B2 * | 10/2017 | Hyman | B44D 3/18 |
| 12,238,839 | B2 * | 2/2025 | Casey | H05B 47/11 |
| 2001/0030868 | A1 * | 10/2001 | McKinley | F21V 33/0096 362/355 |
| 2005/0264472 | A1 * | 12/2005 | Rast | G09G 3/14 345/30 |
| 2007/0247832 | A1 * | 10/2007 | Barker | F04D 29/005 362/96 |
| 2011/0044045 | A1 | 2/2011 | Kostka | |
| 2015/0125829 | A1 * | 5/2015 | Hyman | B44C 3/046 434/81 |
| 2022/0170320 | A1 * | 6/2022 | Casey | H05B 47/11 |

* cited by examiner

*Primary Examiner* — Juan G Flores
(74) *Attorney, Agent, or Firm* — Li & Cai Intellectual Property Office

(57) ABSTRACT

A ceiling fan with an electronic paper display assembly is provided. The ceiling fan has at least one fixed assembly and at least one movable assembly. The fixed assembly has at least one hanging component fixed on a top wall or an above area of an indoor space. The movable assembly is connected to the fixed assembly, and the movable assembly includes a plurality of fan blades. At least one surface of the fixed assembly or the movable assembly is provided with at least one electronic paper display assembly. The at least one electronic paper display assembly can be controlled by a processing unit to change graphics or colors displayed by the at least one electronic paper display assembly, thereby causing graphics or colors of the fixed assembly or the movable assembly to be changed.

11 Claims, 14 Drawing Sheets

CEILING FAN WITH ELECTRONIC PAPER DISPLAY ASSEMBLY

CROSS-REFERENCE TO RELATED PATENT APPLICATION

This application claims the benefit of priority to the U.S. Provisional Patent Application Ser. No. 63/617,772, filed on Jan. 5, 2024, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a ceiling fan, and more particularly to a ceiling fan with an electronic paper display assembly used to promote air circulation.

BACKGROUND OF THE DISCLOSURE

Ceiling fans are usually installed on a top wall or an above area of the indoor space or the public place to generate airflow and promote air circulation.

The graphics or colors of the appearance of existing ceiling fans are usually fixed, so that the existing ceiling fans do not have the function of changing the appearance of graphics or colors to suit changes in the environment, or to display information.

In the prior art, the U.S. application US20110044045A1, a ceiling fan with an OLED display component provided on the fan blades is disclosed. Through the OLED display component, the fan blades of the ceiling fan can emit diffuse light of different colors, thereby changing the color of the appearance of the ceiling fan.

The OLED display component uses an organic material as a light-emitting layer. By applying current, the organic material will emit light and generate images by themselves. However, the substrate of the OLED display component has a certain thickness and weight, and requires complex power supply and control circuits. Therefore, installing the OLED display component on the fan blade of the ceiling fan will increase the weight of the fan blade and change the aerodynamic appearance of the fan blade. In addition, since the OLED display component needs to consume a certain amount of current and requires continuous power supply to maintain lighting or display graphics, the power consumption of the ceiling fan is increased, and when the ceiling fan stops running, the power must be continuously supplied to maintain the graphics or colors displayed by the OLED display component.

Due to the above factors, existing ceiling fans cannot change the appearance color or graphics, and the technology of installing the OLED display component on the fan blade or the ceiling fan to change the graphics or colors of the appearance of the fan blade or the ceiling fan is also limited in application due to the characteristics of the OLED display component. Therefore, how to overcome the above-mentioned defects through structural design improvements has become one of the important issues to be solved.

SUMMARY OF THE DISCLOSURE

In response to the above-referenced technical inadequacy, the present disclosure provides a ceiling fan with an electronic paper display assembly.

In order to solve the above-mentioned problems, one of the technical aspects adopted by the present disclosure is to provide a ceiling fan with an electronic paper display assembly, which includes a fixed assembly and a movable assembly. The fixed assembly is configured to be disposed on a top wall or an above area of an indoor space. The movable assembly is connected to the fixed assembly, in which the movable assembly includes a plurality of fan blades, and the plurality of fan blades of the movable assembly is configured to be driven and rotated by a driving assembly. At least one electronic paper display assembly is provided on at least one surface of the fixed assembly or the movable assembly. When graphics or colors displayed by the at least one electronic paper display assembly is changed according to the control of a processing unit of the ceiling fan, graphics or colors presented by the fixed assembly or the movable assembly is changed.

One of the beneficial effects of the present disclosure is that the ceiling fan with the electronic paper display assembly provided by the present disclosure can use the electronic paper display assembly provided on at least one surface of the ceiling fan to change the graphics or colors presented by the at least one surface of the ceiling fan.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
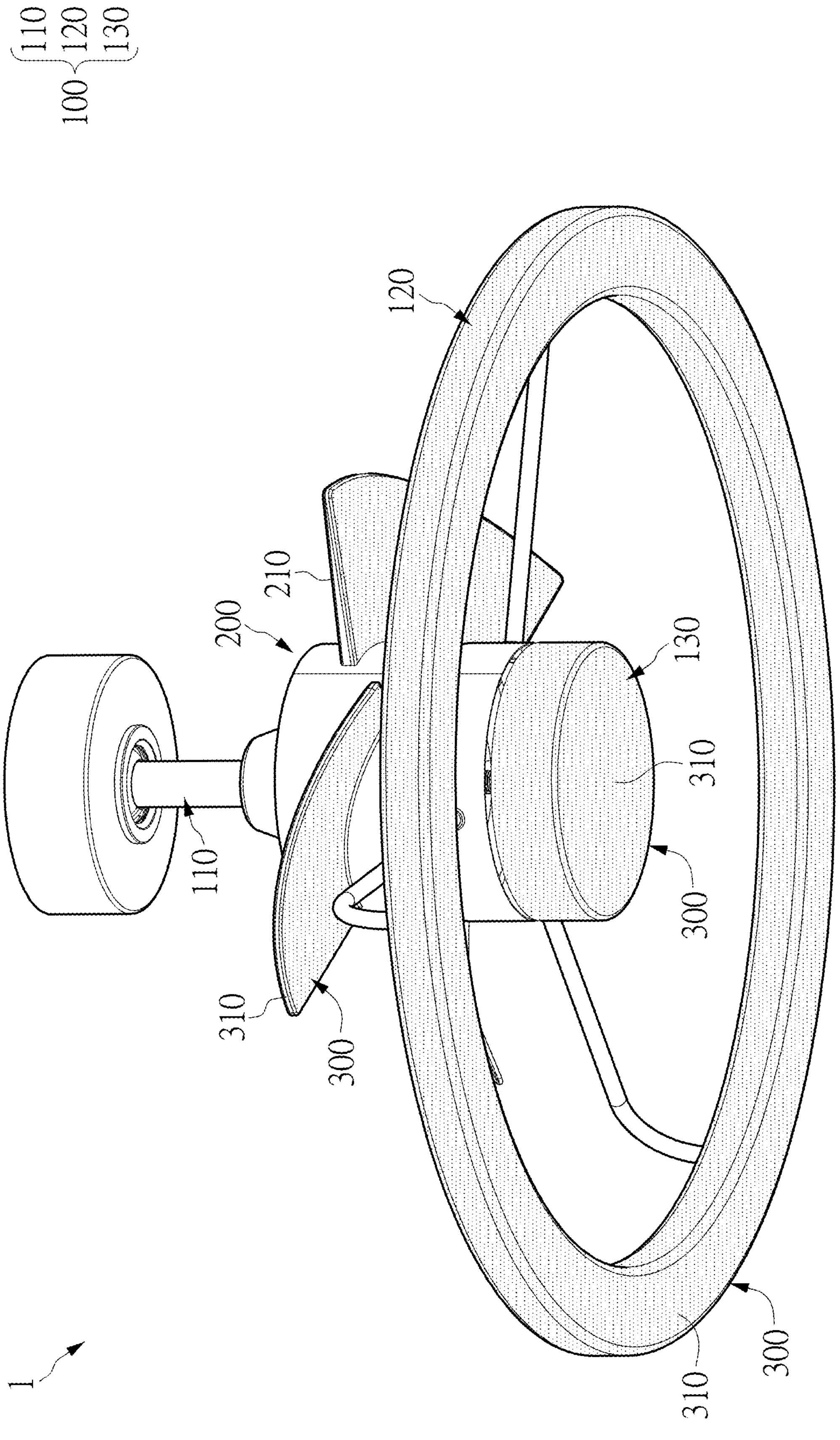
FIG. 1 is a schematic perspective view of the ceiling fan with the electronic paper display assembly according to the first embodiment of the present disclosure.

The present disclosure is more particularly described in the following embodiments and examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 7, a first embodiment of the present disclosure provides a ceiling fan 1 with an electronic paper display assembly 300. As shown in FIG. 1, in this embodiment, the ceiling fan 1 includes a fixed assembly 100, a movable assembly 200, and a driving assembly and a control assembly that are not shown in the figures.

The fixed assembly 100 may include a hanging component 110, a surrounding assembly 120, and at least one fixing casing 130 (or fixing shell), but the present disclosure is not limited thereto, in which the hanging component 110 can be installed on a top wall or an above area of an indoor space so as to install the ceiling fan 1 on the top wall or the above area of the indoor space. The surrounding assembly 120 can be composed of an annular component surrounding the periphery of the ceiling fan 1, or a plurality of components that can be arranged in an annular shape surrounding the periphery of the ceiling fan 1.

The movable assembly 200 includes a plurality of fan blades 210, which are connected to a hub and a driving assembly (not shown) of the ceiling fan 1, so that the plurality of fan blades 210 can be driven and rotated by the driving assembly to generate air flow.

As shown in FIG. 1 to FIG. 5, the fixed assembly 100 and the movable assembly 200 of the ceiling fan 1 respectively have multiple surfaces that can be seen by users in the indoor space when the ceiling fan is in use, and at least one electronic paper display assembly 300 can be provided on at least one surface of the fixed assembly 100 or the movable assembly 200. The electronic paper display assembly 300 can be configured to change the graphics or colors (or the pattern) of at least one surface of the ceiling fan 1.

Figure 2:
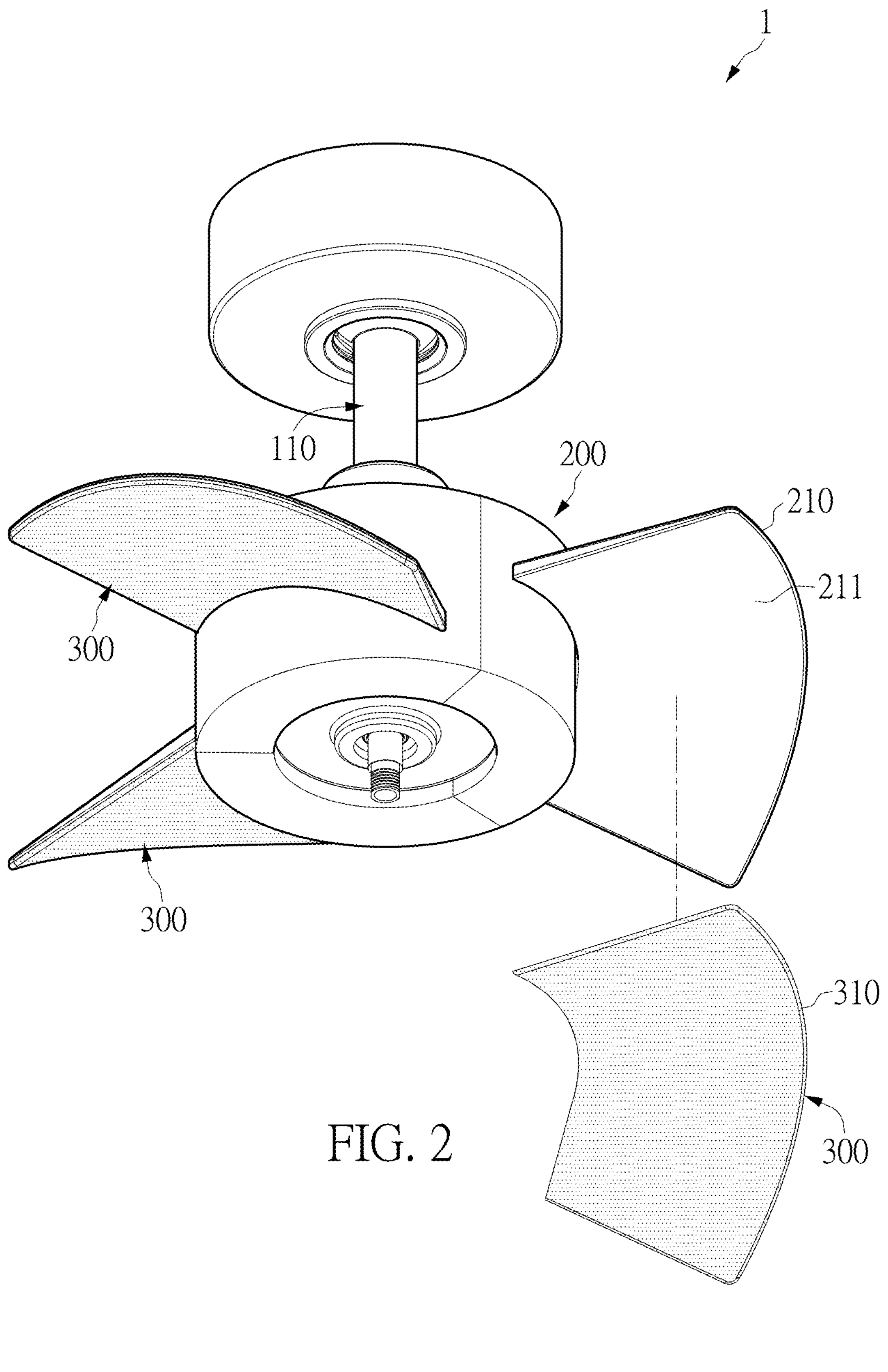
FIG. 2 is a partially schematic exploded view of the electronic paper display assemblies being respectively installed on the fan blades of the ceiling fan in the first embodiment of the present disclosure.

As shown in FIG. 2, in this embodiment, the visible surface of the movable assembly 200 is the bottom surface 211 of the multiple fan blades 210, and the multiple electronic paper display assemblies 300 are disposed on the bottom surface of the fan blades 210. Therefore, the graphics or colors displayed on the bottom surface of the fan blade 210 can be changed or adjusted through the multiple electronic paper display assembly 300.

Figure 3:
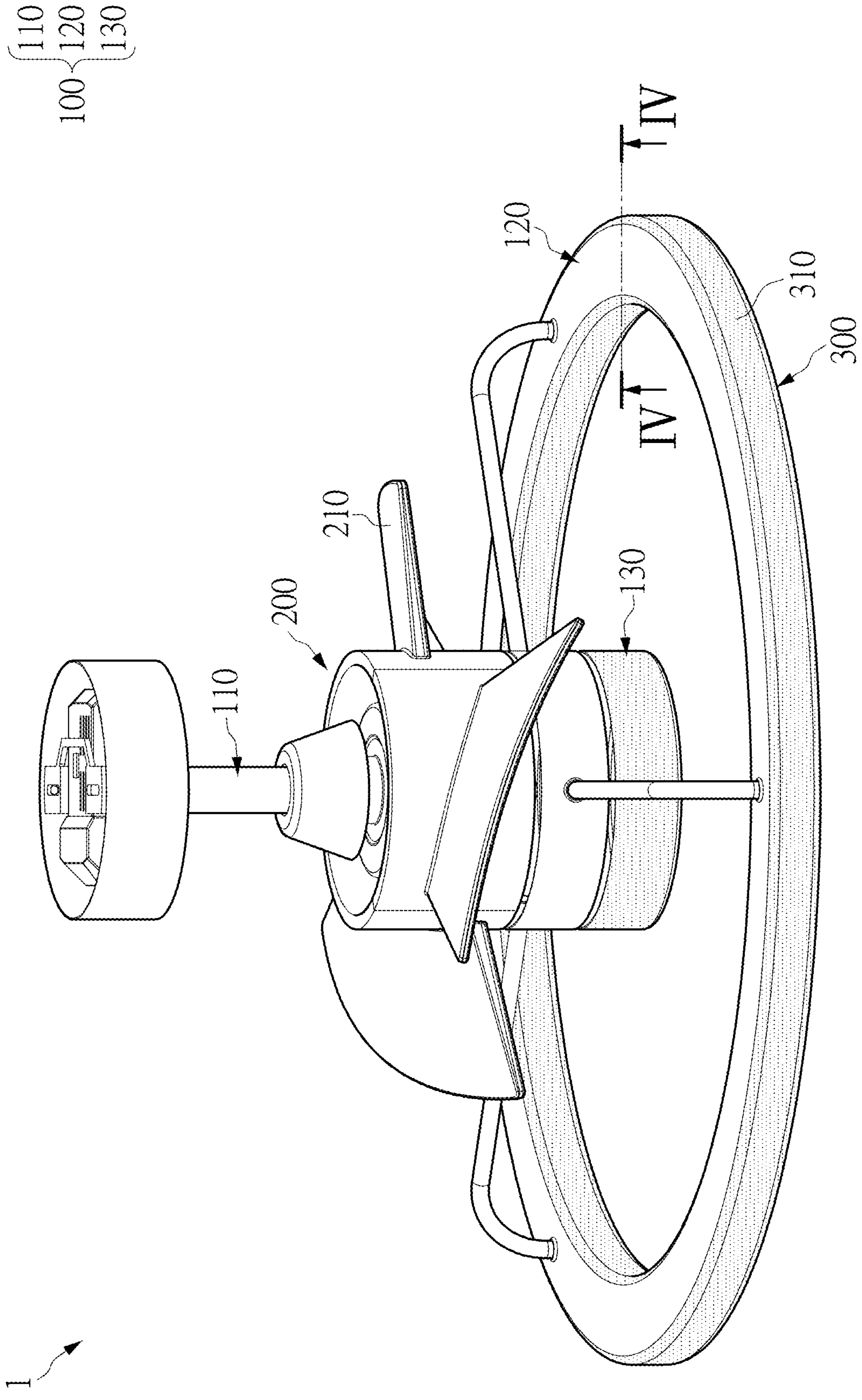
FIG. 3 is another perspective schematic view of the ceiling fan with the electronic paper display assembly according to the first embodiment of the present disclosure.
Figure 4:
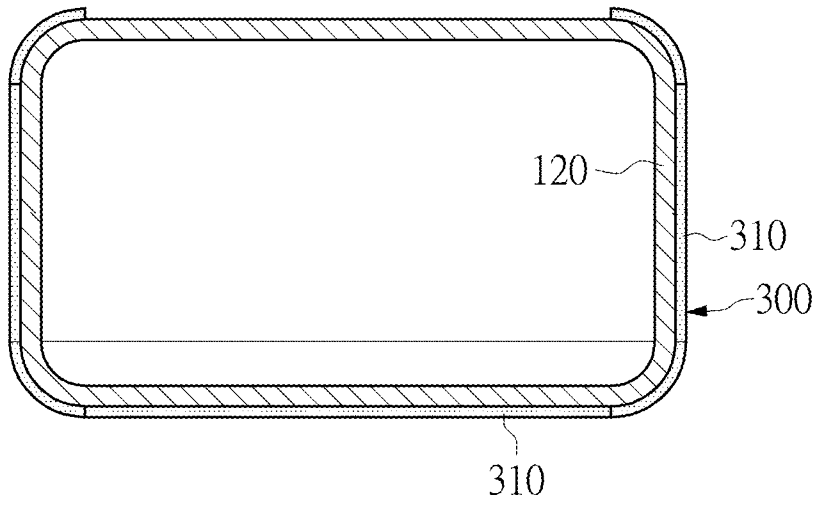
FIG. 4 is a schematic cross-sectional view taken along line IV-IV of FIG. 3 to show the manner in which the electronic paper display assembly is disposed on the surrounding assembly.

As shown in FIG. 3 and FIG. 4, in this embodiment, the bottom surface, the outer lateral surface, and the inner lateral surface of the surrounding assembly 120 of the fixed assembly 100 can be visible surfaces, and the electronic paper display assembly 300 can be provided on the surface of the surrounding assembly 120.

Figure 5:
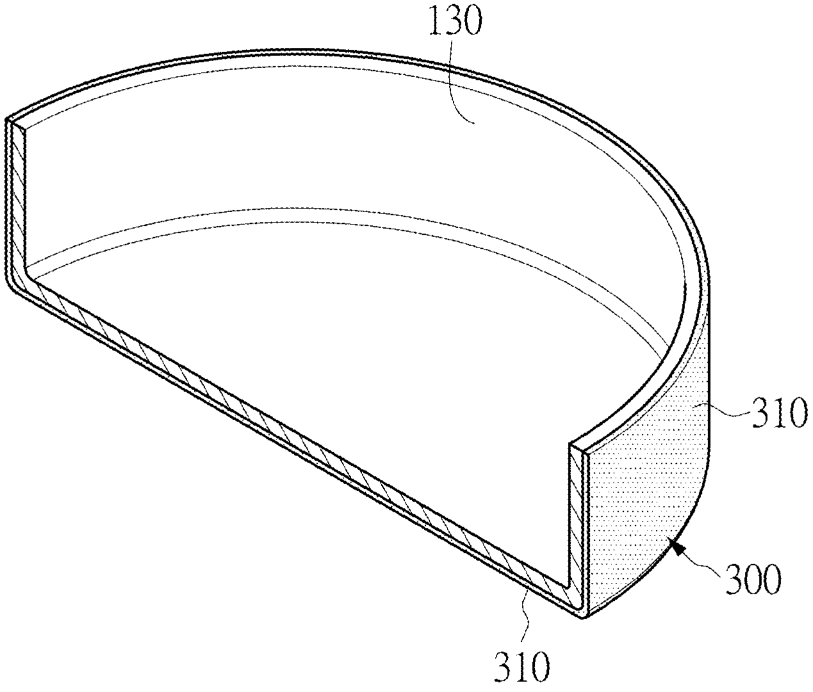
FIG. 5 is a schematic cross-sectional view of the fixing casing of the first embodiment of the present disclosure to show the manner in which the electronic paper display assembly is disposed on the fixing casing.

As shown in FIG. 5, the bottom surface and the lateral surface of the fixing casing 130 of the fixed assembly 100 are visible surfaces, and the electronic paper display assembly 300 is provided on the bottom surface and side surfaces of the fixing casing 130.

It should be noted that in the embodiment shown in FIG. 1, although the electronic paper display assembly 300 can be provided on the surface of the surrounding assembly 120 of the fixed assembly 100, the surface of the fixing casing 130, and the surfaces of the fan blades 210 of the movable assembly 200, but the present disclosure is not limited thereto. For example, the position of the electronic paper display assembly 300 is not limited to the positions disclosed in the foregoing figures, and any visible surface of the fixed assembly 100 or the movable assembly 200 on the ceiling fan 1 in use can be provided with the electronic paper display assembly 300. In addition, the ceiling fan 1 of the present disclosure can only provide the electronic paper display assembly 300 on one of the fixed assembly 100 or the movable assembly 200, and does not need to install the electronic paper display assembly 300 on the fixed assembly 100 and the movable assembly 200 at the same time.

In more detail, the electronic paper display assembly 300 may include at least one flexible electronic paper display 310 (i.e., E-paper display). The electronic paper display 310 is a thin-film display using electronic ink (E-Ink) display technology which generally includes some main components such as upper and lower substrates, microcapsules, pigment particles, and upper and lower electrodes. The substrate is usually made of plastic or glass material, and used as a support structure for the thin-film display. There is a transparent polymer base in the gap between the upper and lower substrates, and the microcapsules are distributed in the transparent polymer base. The interior of the microcapsules contains charged pigment particles that can move under the influence of an electric field to form a visible image. The upper and lower electrodes are disposed on the substrate to control the generation of electric fields to control the color change displayed by the microcapsules, thereby changing the graphics or colors displayed by the electronic paper display 310.

The electronic paper display 310 can use electrophoretic display technology (EPD) or electrochromic display technology (ECD) to control the movement of pigment particles in the microcapsules of the electronic paper display 310 to form images. The electronic paper display only requires power when refreshing the display content or images, but does not require power when displaying statically. Moreover, the electronic paper display itself does not emit light and does not require a backlight, so that it has the characteristics of low power consumption. In addition, the electronic paper display 310 has a film-like structure and its control circuit is simple, so that it has the characteristics of small size, thin thickness, and light weight.

Since the structure and specific details of the electronic paper display 310 are considered well known to those skilled in the art, further description of the structure and technical details thereof is not necessary.

The electronic paper display assembly 300 of the present disclosure is flexible due to the above characteristics of the electronic paper display. Therefore, the electronic paper display assembly 300 can conform to the curved shape of the fixed assembly 100 or the movable assembly 200 of the ceiling fan 1 and be disposed on the surface of the fixed assembly 100 or the movable assembly 200 of the ceiling fan 1 in a conforming manner, and the electronic paper display assembly 300 will not significantly increase the thickness and the weight of the fixed assembly 100 or the movable assembly 200 of the ceiling fan 1. Moreover, when the electronic paper display assembly 300 is disposed on the aerodynamic surface of the fan blade 210 of the ceiling fan 1, the appearance of the aerodynamic surface of the fan blade 210 will not be significantly changed, which will not affect the aerodynamic performance of the fan blade 210.

Since the electronic paper display assembly 300 has low power consumption and can maintain the characteristics of displayed graphics or colors without supplying power, the electronic paper display assembly 300 will not increase the power consumed by the ceiling fan 1, and when the ceiling fan 1 is not running, the electronic paper display assembly 300 can still maintain the graphics or colors in the last display state.

Figure 6:
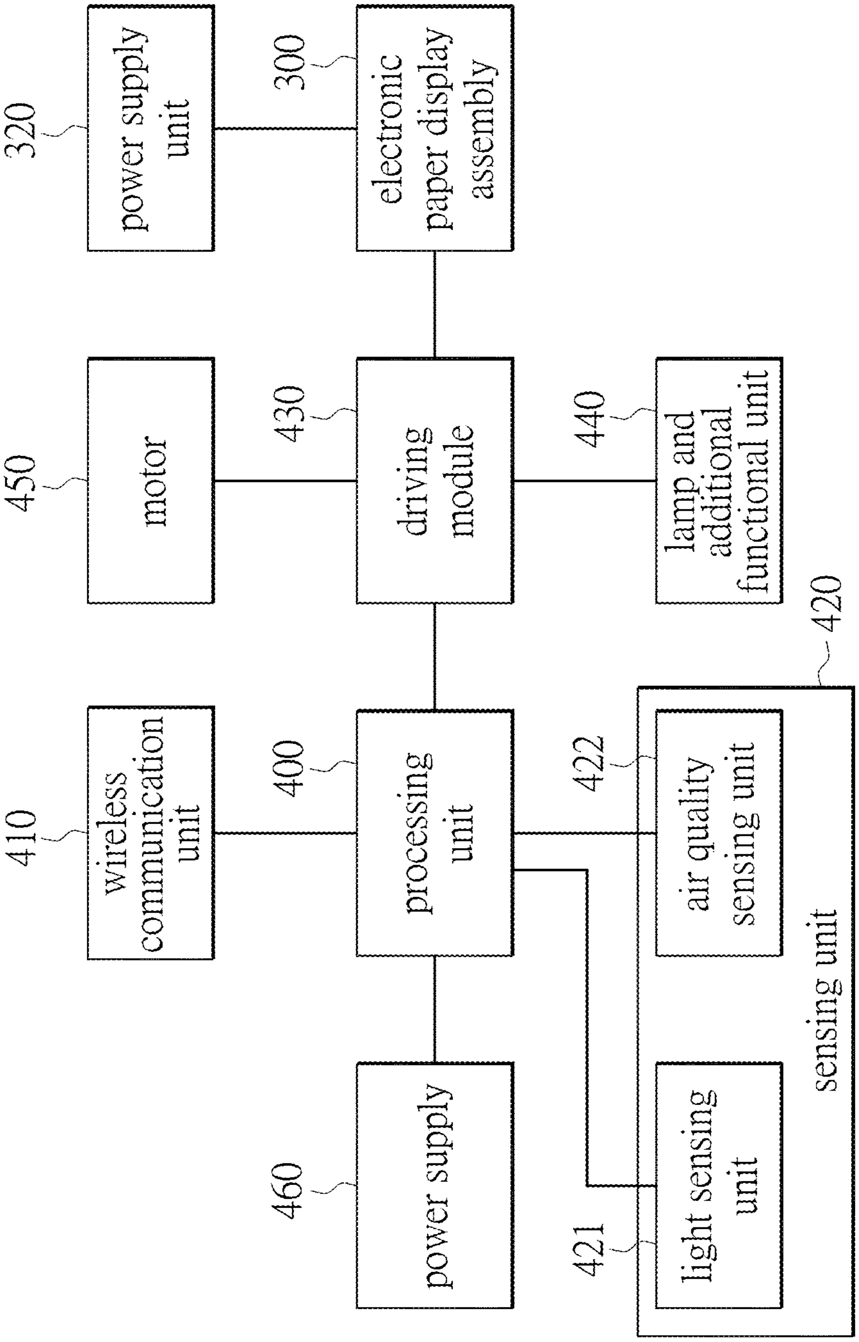
FIG. 6 is a functional block diagram of the ceiling fan with the electronic paper display assembly according to the present disclosure.
Figure 7:
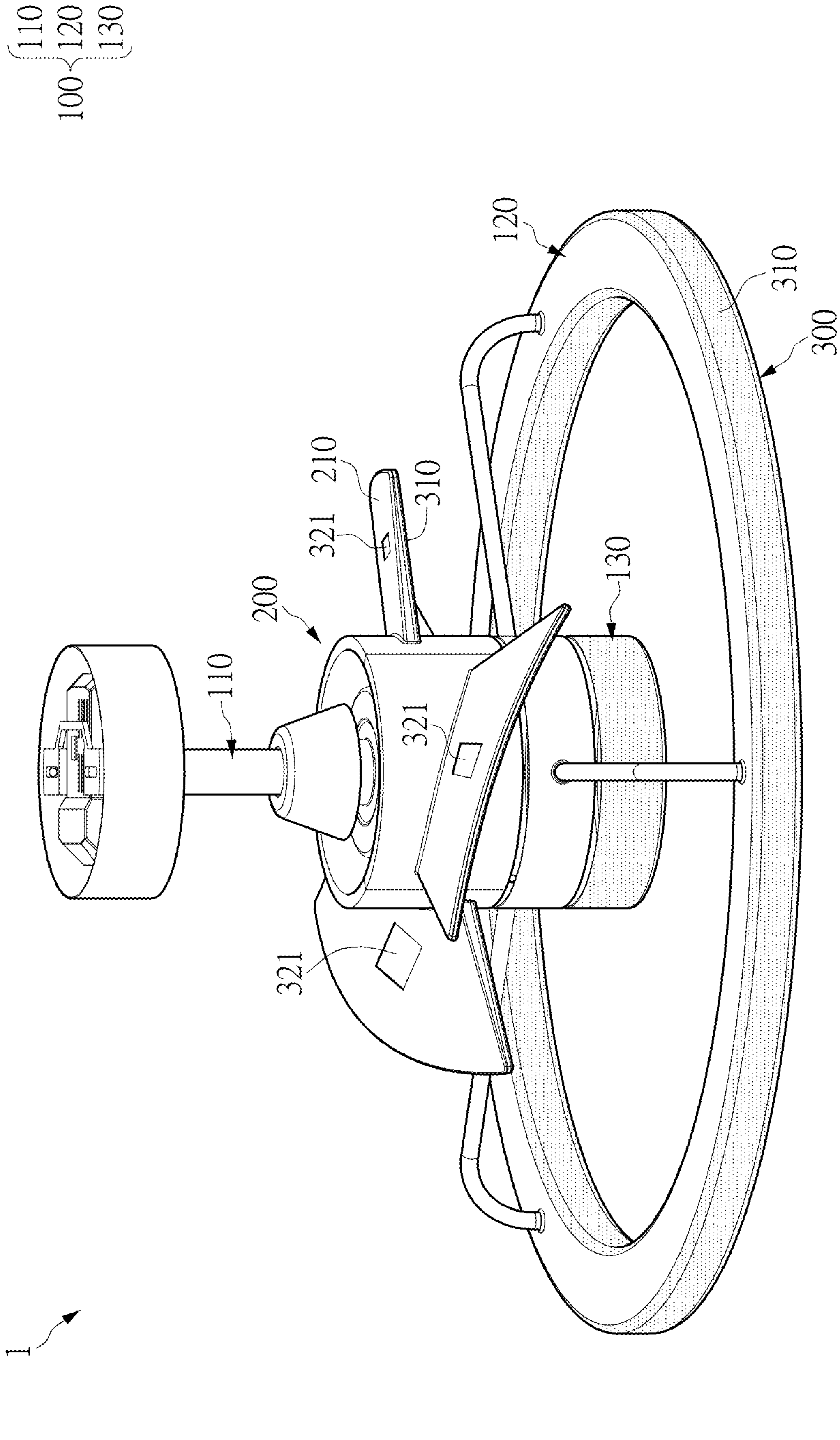
FIG. 7 is a schematic perspective view of the power generation component provided on the fan blade of the ceiling fan in the first embodiment of the present disclosure, to illustrate a method of using the power generation component to supply power to the electronic paper display assembly.

FIG. 6 shows a functional block diagram of the control circuit of the ceiling fan 1 and the electronic paper display assembly 300 of the present disclosure. In this embodiment, the control circuit includes a power supply 460, a processing unit 400, a wireless communication unit 410, a sensing unit 420, a driving module 430, a motor 450, a lamp and additional functional unit 440, at least one electronic paper display assembly 300 and a power supply unit 320.

More particularly, the power supply 460 can be used to supply the power required by the ceiling fan 1 or the electronic paper display assembly 300. The processing unit 400 includes a microprocessor for controlling the operations of the ceiling fan 1 and the electronic paper display assembly 300. The wireless communication unit 410 and the sensing unit 420 are electrically connected to the processing unit 400. The wireless communication unit 410 can be one of the wireless communication devices that can be selected from Bluetooth, Wi-Fi, LoRa, ZigBee, RFID, UWB, IrDA and other types of wireless communication protocols, and can communicate with the electronic devices (such as mobile phones, remote controls, smart home gateways, or other electronic devices with networking capabilities) through wireless communication means and receive instructions or messages from the electronic devices.

The sensing unit 420 is electrically connected to the processing unit 400. The sensing unit 420 may include a light sensing unit 421 and an air quality sensing unit 422 that can be used to detect at least one environmental parameter of the environment around the ceiling fan 1, and the processing unit 400 can be configured to control the ceiling fan 1 and the electronic paper display assembly 300 according to at least one environmental parameter detected by the sensing unit 420.

The processing unit 400 is also electrically connected to the driving module 430, and controls the motor 450, the lamp and additional functional unit 440, and the electronic paper display assembly 300 through the driving module 430. More particularly, the driving module 430 includes a controller that can be used to control the motor 450, the lamp and additional functional unit 440, and the electronic paper display assembly 300 of the ceiling fan 1. The motor 450 can be used to drive the fan blade 210 of the ceiling fan 1 to generate airflow. The lamp and additional functional unit 440 may include a plurality of additional functional components such as lamps, ultraviolet sterilizers and ozone generators to provide lighting, or provide additional functions such as air purification, sterilization, and air odor elimination. The graphics or colors displayed by the electronic paper display assembly 300 can be controlled by the processing unit 400 and the driving module 430, thereby changing the graphics or colors of the area where the electronic paper display assembly 300 is provided.

In one application embodiment of the ceiling fan 1 with the electronic paper display assembly 300 of the present disclosure, the processing unit 400 of the ceiling fan 1 can control the graphics or colors displayed by the electronic paper display assembly 300 according to the signal received by the wireless communication unit 410, so that the graphics or colors on the surface of the ceiling fan 1 can be changed according to the signal output by the electronic device connected to the wireless communication unit 410. For example, the ceiling fan 1 can communicate with a remote control or mobile phone through the wireless communication unit 410, so that the operator can control the graphics or colors of the electronic paper display assembly 300 through the remote control or mobile phone. For another example, the wireless communication unit 410 can communicate with a smart home gateway, the smart home gateway can output control signals based on built-in software or programs, or the graphics or colors displayed by the electronic paper display assembly 300 can be controlled and changed through the signals output by other electronic devices connected to the smart home gateway.

In another application embodiment of the ceiling fan 1 with the electronic paper display assembly 300 of the present disclosure, the processing unit 400 of the ceiling fan 1 can control the graphics or colors displayed by the electronic paper display assembly 300 according to at least one environmental parameter of the surrounding environment detected by the sensing unit 420, so that the graphics or colors on the surface of the ceiling fan 1 can be changed according to at least one environmental parameter.

In more detail, in this embodiment, the light sensing unit 421 of the sensing unit 420 may include a color temperature sensor or a color sensor (such as a three primary color sensor, a spectrum sensor, or an image sensor, etc.), or a sensor (such as a phototransistor, a digital light sensor, etc.) used to sense light illumination, or a color temperature and illumination composite sensor. The light sensing unit 421 can detect changes in the color temperature, light color, or light illumination of the indoor space, and the processing unit 400 can generate a control signal for controlling the graphics or colors displayed by the electronic paper display assembly 300 based on the detection signal output by the light sensing unit 421, so that the graphics or colors displayed by the electronic paper display assembly 300 can be changed according to different light changes in the surrounding environment.

Figure 11:
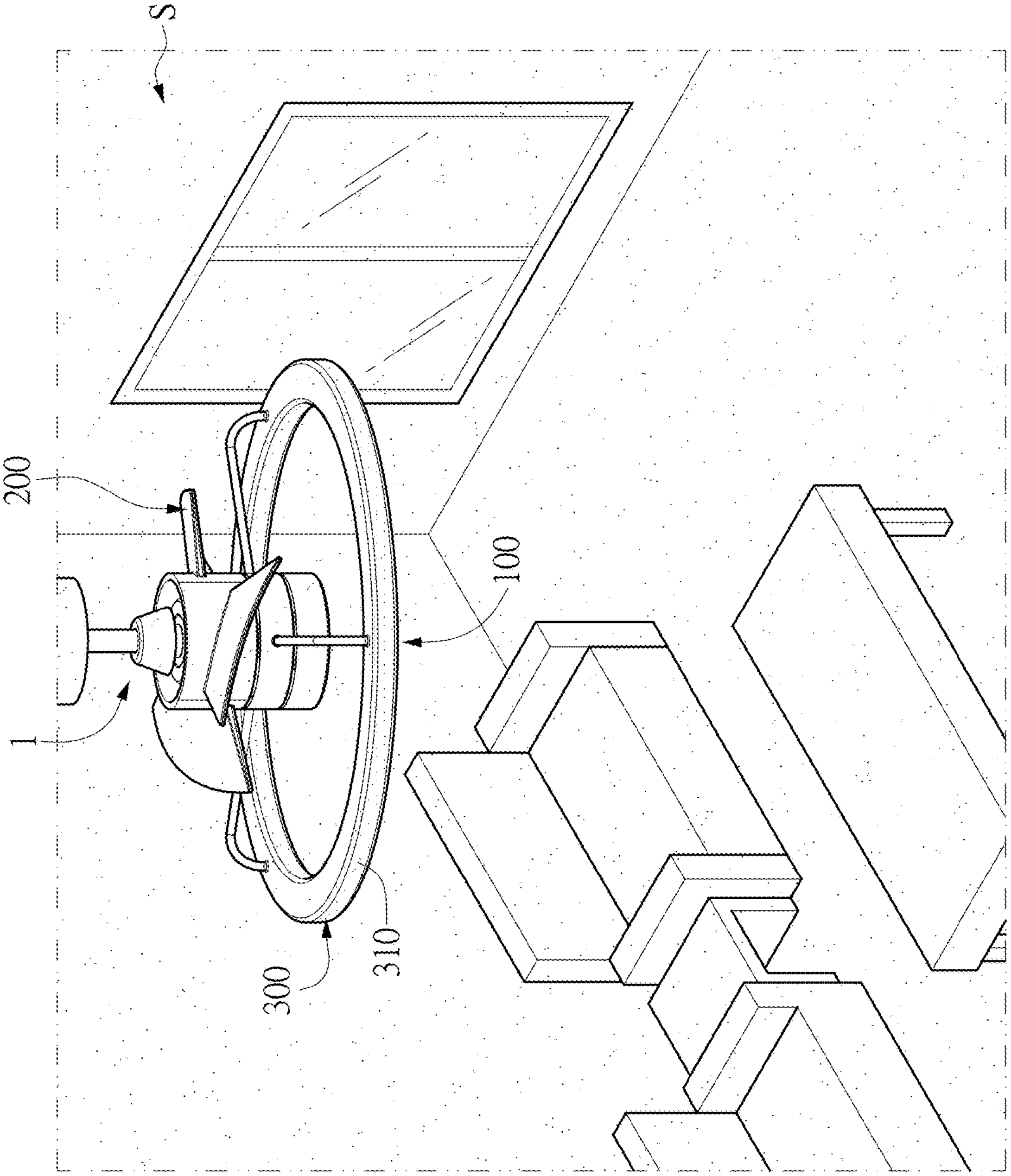
FIG. 11 is a schematic perspective view of the electronic paper display assembly of the ceiling fan of the present disclosure displaying the graphics or colors in a bright or high color temperature or light-colored environment.
Figure 12:
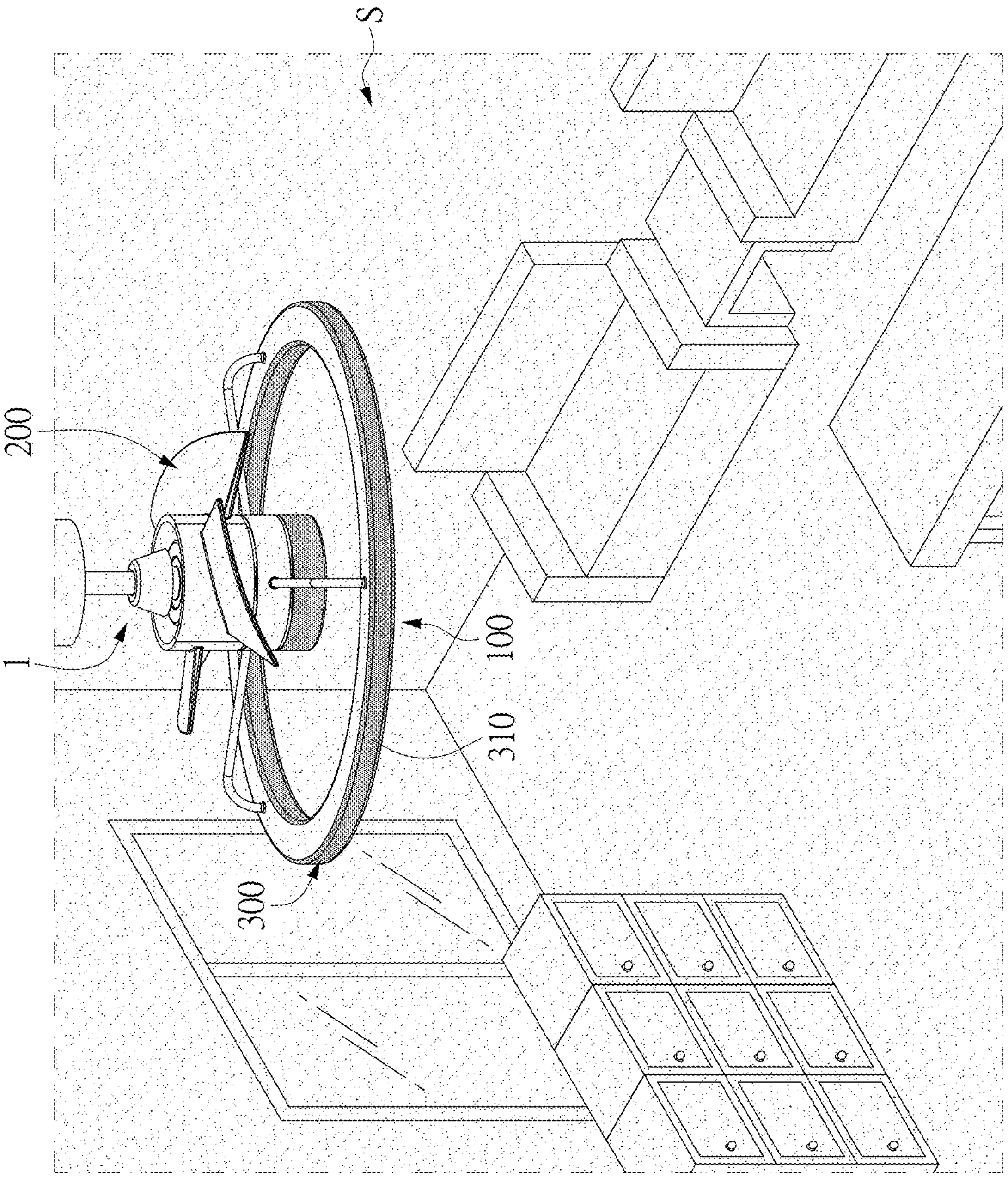
FIG. 12 is a schematic perspective view of the electronic paper display assembly of the ceiling fan of the present disclosure displaying the graphics or colors in a dark or low color temperature or dark-colored environment.

For example, FIG. 11 and FIG. 12 illustrate the situation of changing the graphics or colors of the appearance of the ceiling fan 1 of this embodiment according to changes in indoor light. FIG. 11 disclosures that when the ceiling fan 1 is in a bright light illumination or in a high color temperature (such as higher than 4000K), or in a light-colored environment in an indoor space S, the processing unit 400 of the ceiling fan 1 can control the electronic paper display assembly 300 on the outer surface of the ceiling fan 1 to display colors or graphics that can match the bright light illumination, the high color temperature, or the light-colored environment. FIG. 12 disclosures that when the ceiling fan 1 is in a low illumination or in a low color temperature (such as less than 3500K), or in a dark-colored environment in an indoor space S, the processing unit 400 of the ceiling fan 1 can control the electronic paper display assembly 300 on the outer surface of the ceiling fan 1 to display colors or graphics that can match the low illumination, the low color temperature, or the dark-colored environment.

Therefore, the ceiling fan 1 of the present disclosure can change the graphics or colors of the appearance of the ceiling fan 1 according to changes in natural light during the day and night, or changes in the brightness or color temperature of the indoor lighting, as well as changes in the color of interior decoration or furnishings, so that the graphics or colors of the appearance of the ceiling fan 1 can be integrated into or consistent with the indoor environment.

The air quality sensing unit 422 of the sensing unit 420 may include one or more sensors for detecting air quality, such as carbon dioxide ($CO_2$) sensors, volatile organic compound (VOC) sensors, fine suspended particulate (PM2.5 and PM10) sensors (or aerosol particle sensors), carbon monoxide (CO) sensors, ozone ($O_3$) sensors, temperature and humidity sensors, etc. The processing unit 400 is configured to detect one or more air quality-related parameters (such as carbon dioxide concentration, chemical volatile matter concentration, airborne particulate concentration, ozone concentration, temperature, humidity, etc.) of the indoor space through the air quality sensing unit 422 in order to determine the air quality status of the indoor environment, and control the electronic paper display assembly 300 to display different graphics or colors according to the air quality status.

Figure 13:
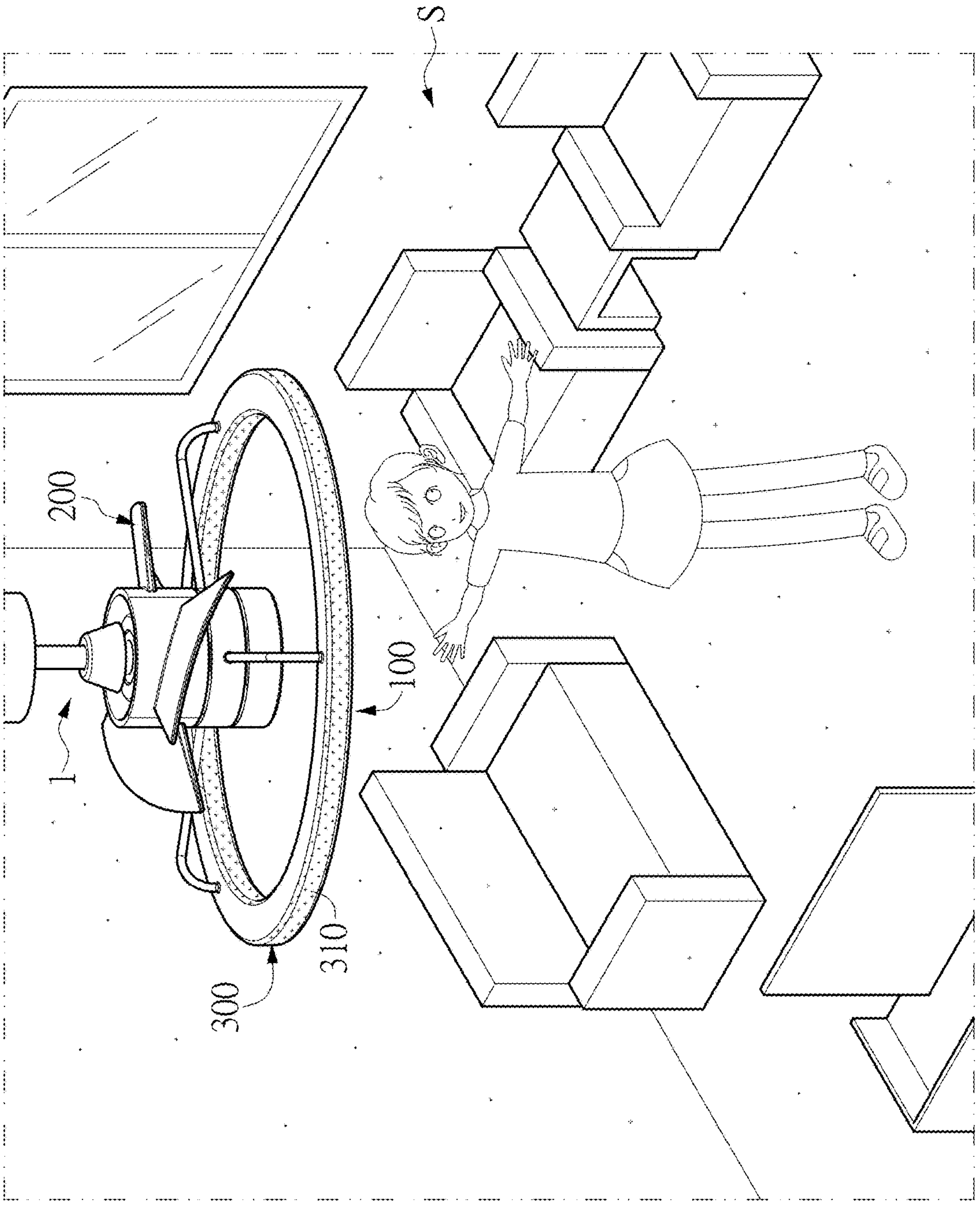
FIG. 13 is a schematic perspective view of the electronic paper display assembly of the ceiling fan of the present disclosure displaying the graphics or colors in an environment with good air quality.
Figure 14:
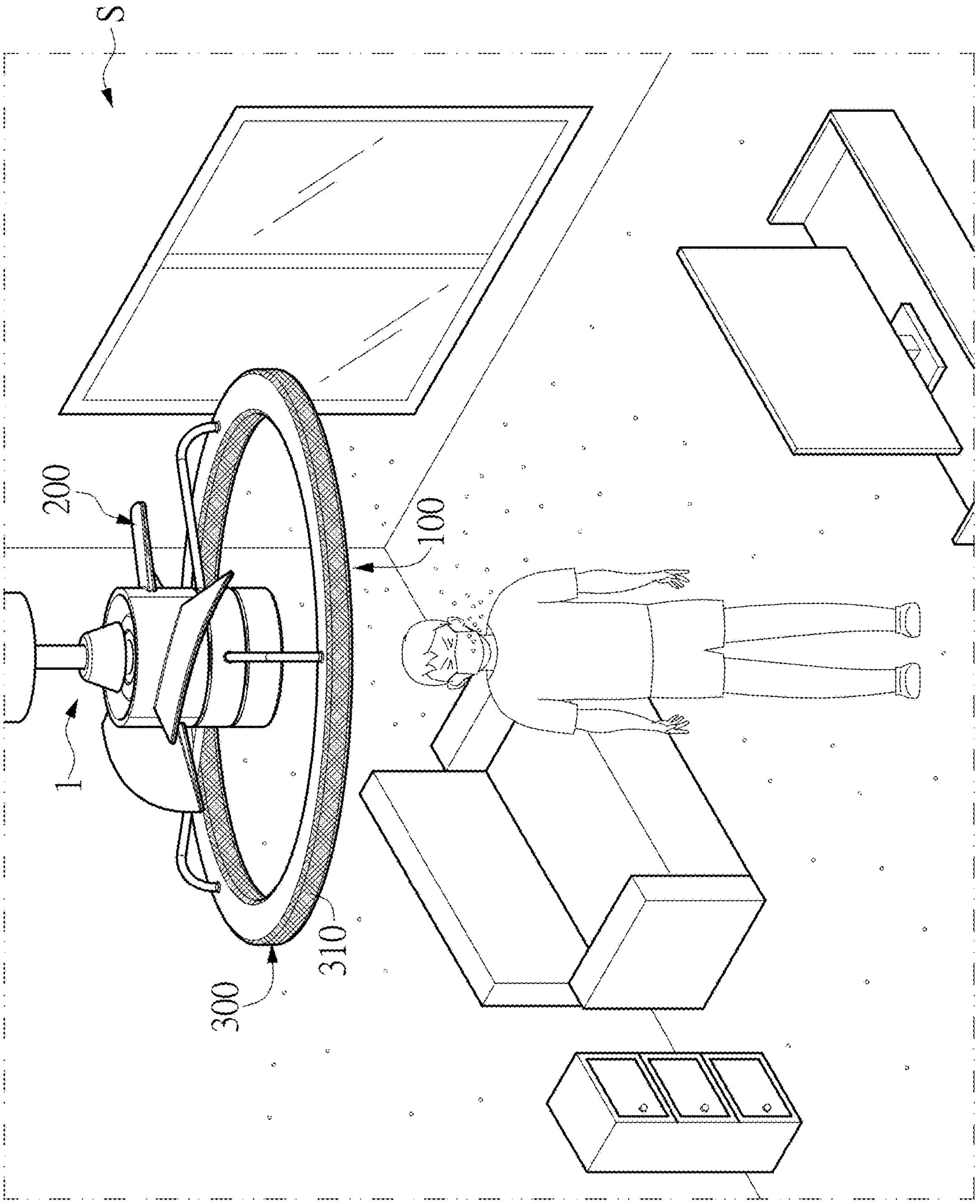
FIG. 14 is a schematic perspective view of the electronic paper display assembly of the ceiling fan of the present disclosure displaying the graphics or colors in an environment with poor air quality.

FIG. 13 and FIG. 14 illustrate that the graphics or colors of the appearance of the ceiling fan 1 of this embodiment can be changed according to changes in the indoor air quality status. As shown in FIG. 13, when the processing unit 400 determines that the indoor air quality status is good, the electronic paper display assembly 300 can be controlled to display the graphics or colors representing good indoor air quality. As shown in FIG. 14, when the processing unit 400 determines that the indoor air quality is poor, the electronic paper display assembly 300 can be controlled to display the graphics or colors representing poor indoor air quality. Therefore, the user can know the indoor air quality status through the colors or graphics of the appearance of the ceiling fan 1 displayed on the electronic paper display assembly 300, and then take corresponding actions based on the air quality status shown on the appearance of the ceiling fan 1.

It should be noted that FIG. 6 shows that the sensing unit 420 is directly connected to the processing unit 400, but the present disclosure is not limited thereto. For example, in an embodiment not shown in the drawings of the present disclosure, the sensing unit 420 can be connected to the wireless communication unit 410 by wireless communication means, and then connected to the processing unit 400 through the wireless communication unit 410. In addition, the light sensing unit 421 and the air quality sensing unit 422 of the sensing unit 420 are not limited to being provided on the ceiling fan 1. For example, various sensors of the light sensing unit 421 and the air quality sensing unit 422 of the sensing unit 420 can be installed at different locations in the indoor space S and connected to the processing unit 400 through wireless communication means, or connected to the processing unit 400 through communication between the communication relay device (such as a smart home gateway, a wireless game device, etc.) and the wireless communication unit 410 of the ceiling fan 1.

As shown in FIG. 6, the power supply unit 320 is connected to the electronic paper display assembly 300 and is used to provide the power required by the electronic paper display assembly 300. In an embodiment of the present disclosure, the power supply unit 320 is an electrical connection device connected between the power supply 460 of the ceiling fan 1 and the electronic paper display assembly 300, so that the power supply 460 of the ceiling fan 1 can supply power to the electronic paper display assembly 300.

In another embodiment of the present disclosure, the power supply unit 320 may include at least one power generation component 321. In the embodiment shown in FIG. 7, the power generation component 321 can be disposed on the fan blade 210, and the power generation component 321 can be a solar cell, a wind power generation component, a piezoelectric power generation component or other types of power generation components. The power supply unit 320 can supply power generated by the power generation component 321 to the electronic paper display assembly 300.

Figure 8:
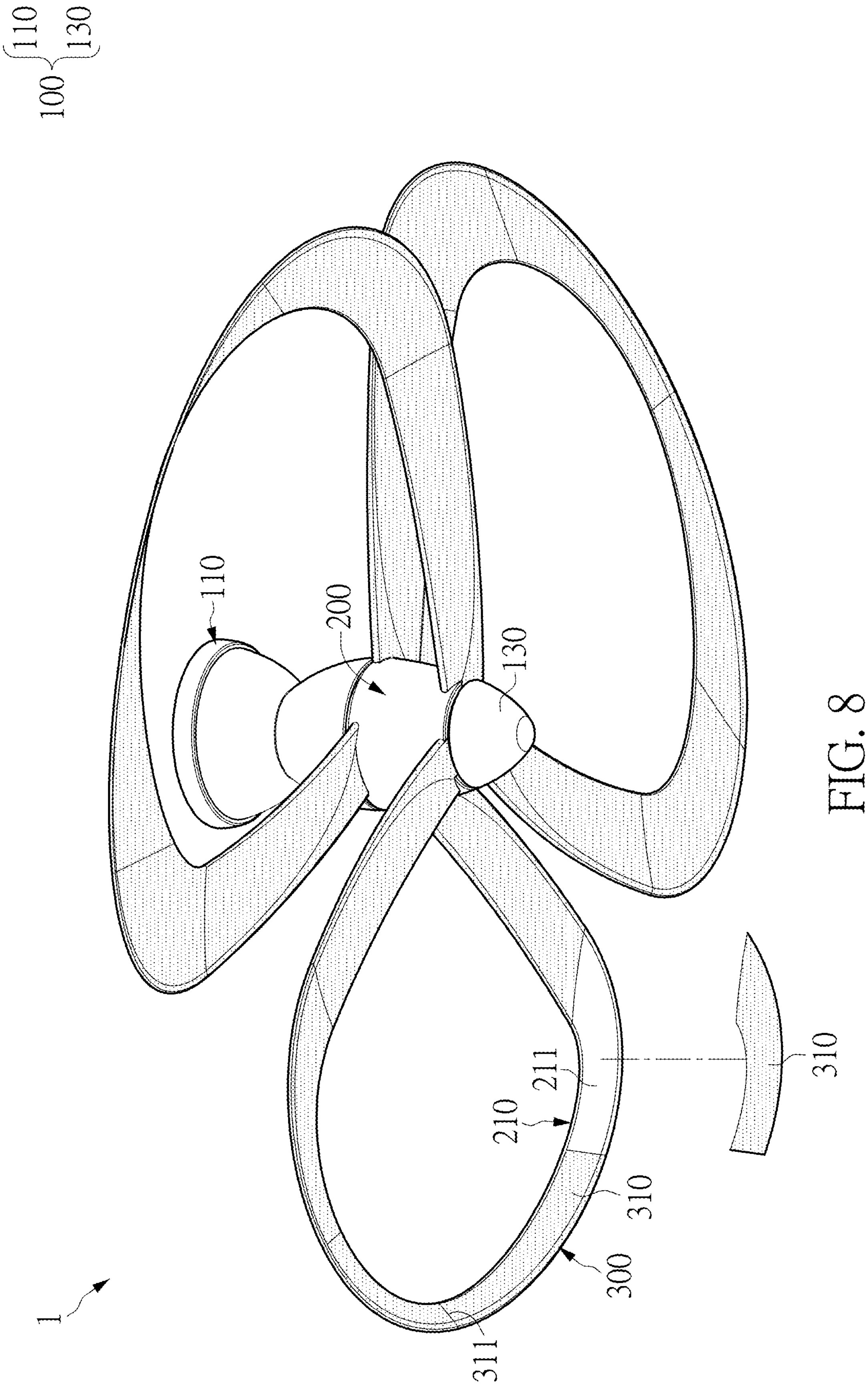
FIG. 8 is a schematic perspective view of the ceiling fan with the electronic paper display assembly according to the second embodiment of the present disclosure, to illustrate the electronic paper display assembly that is disposed on a large curved surface or an arc surface.
Figure 9:
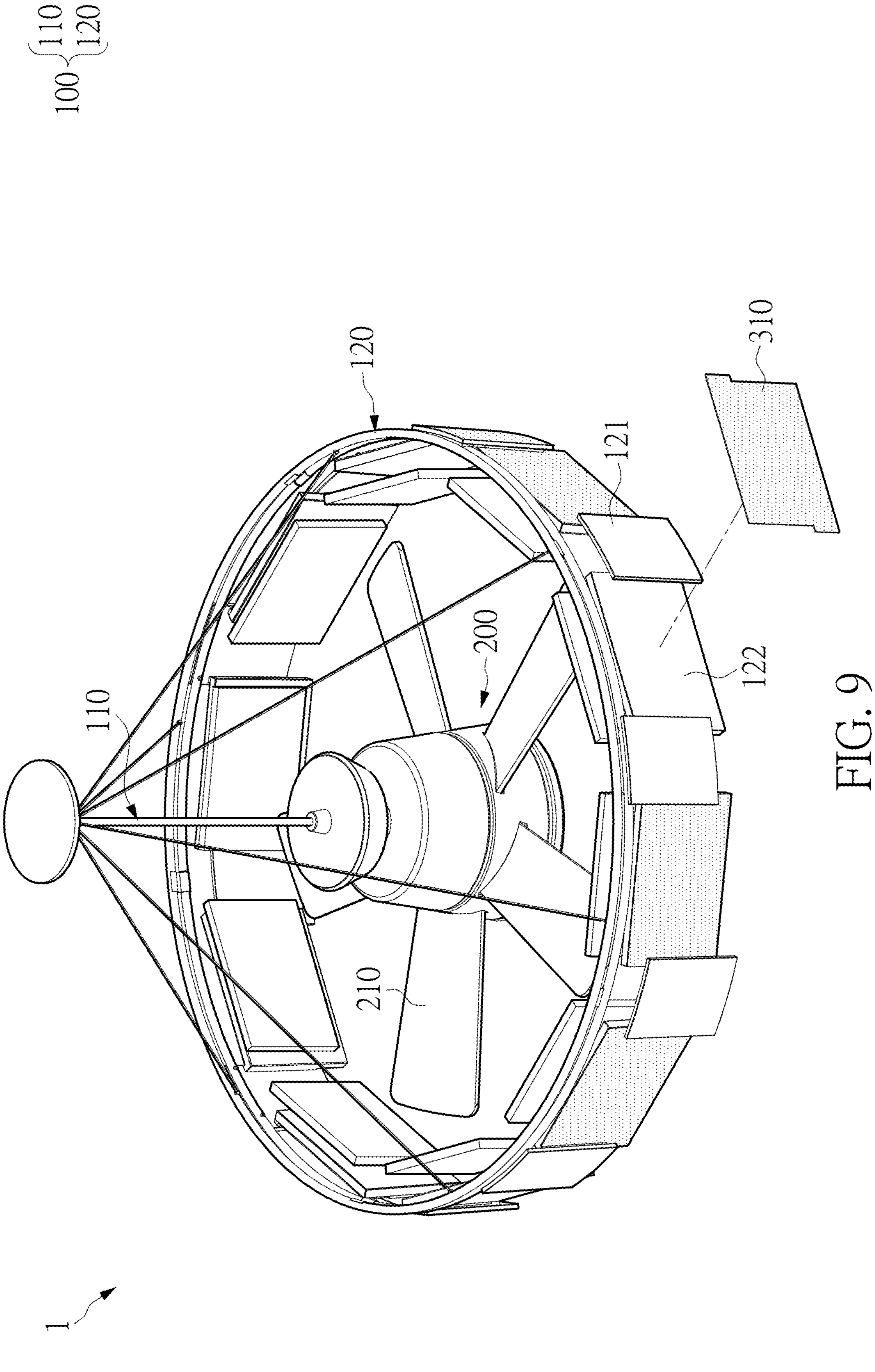
FIG. 9 is a schematic perspective view of the ceiling fan with the electronic paper display assembly according to the third embodiment of the present disclosure, to illustrate the electronic paper display assembly that is disposed on multiple panel surfaces formed on the outer surface of the surrounding assembly.
Figure 10:
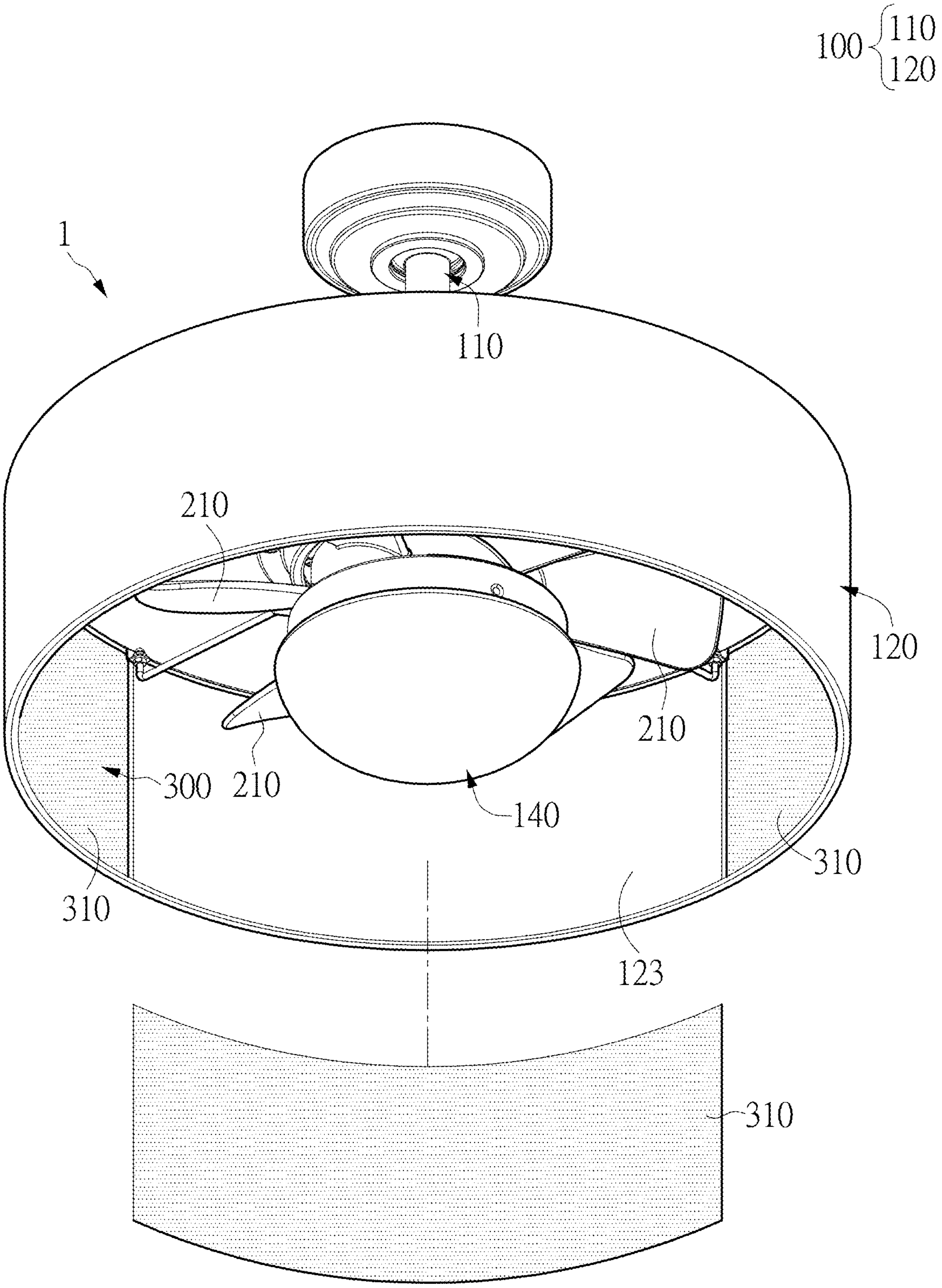
FIG. 10 is a schematic perspective view of the ceiling fan with the electronic paper display assembly according to the fourth embodiment of the present disclosure, to illustrate the electronic paper display assembly that is disposed on the inner surface of the surrounding assembly.

As shown in FIG. 8, it is a second embodiment of the ceiling fan with the electronic paper display assembly of the present disclosure. As shown in FIG. 9, it is a third embodiment of the ceiling fan with the electronic paper display assembly of the present disclosure. As shown in FIG. 10, it is a fourth embodiment of the ceiling fan with the electronic paper display assembly. It should be noted that the basic technical features of the above modified embodiments of the present disclosure are similar to the first embodiment, so similar technical features will not be repeatedly introduced.

As shown in FIG. 8, the second embodiment of the present disclosure discloses an embodiment in which the electronic paper display assembly 300 is disposed on a curved surface with a large curvature or an arc-shaped surface. In this embodiment, the movable assembly 200 of the ceiling fan 1 has a fan blade 210 with a spiral curved arc surface, and the electronic paper display assembly 300 is disposed on the bottom surface 211 of the fan blade 210. Since the fan blade 210 in this embodiment has a very large curvature and is in a spiral shape, the electronic paper display assembly 300 in this embodiment is formed by splicing multiple electronic paper displays 310 together. In this embodiment, the bottom surface 211 of the fan blade 210 is divided into a plurality of divided areas according to the curved arc surface and the curved shape of the fan blade 210 in advance, then each electronic paper display 310 is cut according to the expanded outline shape of the corresponding divided area, and the multiple cut electronic paper displays 310 are attached to the corresponding divided areas, so that the multiple electronic paper displays 310 are spliced into an electronic paper display assembly 300 covering the entire bottom surface 211 of the fan blade 210. In addition, in this embodiment, a seam 311 is formed between the adjacent edges of every two adjacent electronic paper displays 310.

Through splicing, the electronic paper display assembly 300 can be attached to a curved or arc-shaped surface that exceeds the bendability of the electronic paper display 310.

As shown in FIG. 9, in the third embodiment of the present disclosure, the electronic paper display assembly 300 is disposed on the surface of the surrounding assembly 120. In this embodiment, the surrounding assembly 120 includes a plurality of first plates 121 and a second plate 122 spaced apart from each other, and the electronic paper display assembly 300 includes a plurality of electronic paper displays 310 attached to the surface of the second plate 122.

As shown in FIG. 10, the fourth embodiment of the present disclosure is shown. In this embodiment, the surrounding assembly 120 of the fixed assembly 100 is an annular cover surrounding the periphery of the ceiling fan 1. The ceiling fan 1 also has a lamp 140 located inside the surrounding assembly 120. The inner surface 123 of the surrounding assembly 120 facing the lamp 140 forms a reflective surface capable of reflecting light generated by the lamp 140. The electronic paper display assembly 300 is disposed on the inner surface 123 of the surrounding assembly 120.

BENEFICIAL EFFECTS OF THE EMBODIMENTS

One of the beneficial effects of the present disclosure is that the ceiling fan with the electronic paper display assembly provided by the present disclosure can use the electronic paper display assembly provided on at least one surface of the ceiling fan to change the graphics or colors presented by the at least one surface of the ceiling fan.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A ceiling fan, comprising:

a fixed assembly including a hanging component for hanging the ceiling fan, a surrounding assembly, and a fixing casing, wherein the surrounding assembly is an annular component arranged at a periphery of the ceiling fan; and a movable assembly connected to the fixed assembly, wherein the movable assembly includes a plurality of fan blades, and the plurality of fan blades of the movable assembly is configured to be driven and rotated by a driving assembly, wherein the fixing casing is disposed at a lower end of the movable assembly, and the plurality of fan blades are arranged between the fixing casing and the surrounding assembly;

wherein at least one electronic paper display assembly is provided on at least one surface of the surrounding assembly, bottom surfaces of the plurality of fan blades, and at least one surface of the fixing casing; and wherein, when graphics or colors displayed by the at least one electronic paper display assembly is changed according to the control of a processing unit of the ceiling fan, graphics or colors presented by the fixed assembly or the movable assembly is changed;

wherein, the at least one electronic paper display assembly of the bottom surfaces of the plurality of fan blades is located between the at least one electronic paper display assembly of the surrounding assembly and the at least one electronic paper display assembly of the fixed housing.

2. The ceiling fan according to claim 1, wherein the at least one electronic paper display assembly has at least one electronic paper display; wherein the at least one electronic paper display is flexible, the at least one electronic paper display has at least one surface attached to the fixed assembly or the movable assembly, and the at least one surface of the at least one electronic paper display is curved to match with a curved shape of the at least one surface of the fixed assembly or the movable assembly.

3. The ceiling fan according to claim 1, wherein the surrounding assembly has a bottom surface, an outer lateral surface and an inner lateral surface the fixing casing has a bottom surface and a lateral surface, and the at least one electronic paper display assembly is disposed on the bottom surface, the outer lateral surface and the inner lateral surface of the surrounding assembly, and the bottom surface and the lateral surface of the fixing casing.

4. The ceiling fan according to claim 1, wherein the processing unit is connected to a wireless communication unit and a sensing unit, and the processing unit is configured to control graphics or colors displayed by the at least one electronic paper display assembly according to signals output by the wireless communication unit or the sensing unit.

5. The ceiling fan according to claim 4, wherein the sensing unit further includes a light sensing unit, and the light sensing unit includes one or more of a color temperature sensor, an illumination sensor and a color sensor.

6. The ceiling fan according to claim 5, wherein the light sensing unit is configured to detect one or more environmental parameters of light illumination, color temperature and light color surrounding the ceiling fan.

7. The ceiling fan according to claim 4, wherein the sensing unit further includes an air quality sensing unit, and the air quality sensing unit includes one or more of a carbon dioxide sensor, a volatile organic compound sensor, a fine suspended particulate sensor, a carbon monoxide sensor, an ozone sensor, and a temperature and humidity sensor.

8. The ceiling fan according to claim 7, wherein the air quality sensing unit is configured to detect one or more environmental parameters of carbon dioxide concentration, volatile organic matter concentration, fine suspended particulate concentration, carbon monoxide concentration, ozone concentration, temperature and humidity around the ceiling fan.

9. The ceiling fan according to claim 1, further comprising a power supply unit connected to the at least one electronic paper display assembly, wherein the power supply unit includes an electrical connection device connected to a power source of the ceiling fan, or includes at least one power generation component capable of generating power for supplying power to the at least one electronic paper display assembly.

10. The ceiling fan according to claim 1, further comprising a power supply unit, wherein the power supply unit is connected to the electronic paper display assembly to provide power, the power supply unit includes at least one power generation component disposed on each fan blade of the plurality of fan blades.

11. The ceiling fan according to claim 10, wherein the power generation component is a solar cell.

* * * * *